(12) United States Patent
Wang et al.

(10) Patent No.: US 11,079,558 B1
(45) Date of Patent: Aug. 3, 2021

(54) PLUGGABLE TRANSCEIVER RETAINER

(71) Applicant: FINISAR CORPORATION, Sunnyvale, CA (US)

(72) Inventors: William H. Wang, Pleasanton, CA (US); Bill S. Wang, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 16/854,477

(22) Filed: Apr. 21, 2020

(51) Int. Cl.
*G02B 6/42* (2006.01)
*H01R 13/629* (2006.01)

(52) U.S. Cl.
CPC ......... *G02B 6/4201* (2013.01); *G02B 6/4245* (2013.01); *G02B 6/4261* (2013.01); *G02B 6/4277* (2013.01); *G02B 6/4292* (2013.01); *H01R 13/62955* (2013.01)

(58) Field of Classification Search
CPC .. G02B 6/3897; G02B 6/4201; G02B 6/4245; G02B 6/4246; G02B 6/4261; G02B 6/4277; G02B 6/4284; G02B 6/4292; H01R 13/62955; H01R 13/6335

USPC .............................. 385/53, 88–92, 134–139
See application file for complete search history.

(56) References Cited

U.S. PATENT DOCUMENTS

| | | | |
|---|---|---|---|
| 10,859,779 B1* | 12/2020 | Wang | G02B 6/4284 |
| 2009/0279831 A1* | 11/2009 | Luo | H01R 13/6335 385/53 |

\* cited by examiner

*Primary Examiner* — Michael P Mooney
(74) *Attorney, Agent, or Firm* — Blank Rome LLP

(57) ABSTRACT

An optoelectronic module may include a housing enclosing at least one optical transmitter or receiver and a slider configured to move with respect to the housing. The slider may include at least one protrusion configured to engage a cage sized and shaped to receive the housing. The optoelectronic module may include a bail rotatably coupled to the housing. The bail may be configured to actuate the slider when the bail is rotated. The optoelectronic module may include a retainer including an occlusion member sized and shaped to be positioned inside a port of the optoelectronic module. The retainer may define a surface configured to engage with the bail.

20 Claims, 7 Drawing Sheets

PLUGGABLE TRANSCEIVER RETAINER

FIELD

The present disclosure relates to retainers for optoelectronic modules.

BACKGROUND

Unless otherwise indicated herein, the materials described herein are not prior art to the claims in the present application and are not admitted to be prior art by inclusion in this section.

Optoelectronic modules, such as transceivers, may be used to transmit data between different devices or different locations. In particular, optical signals may be used to rapidly communication data (via the optical signals) between different devices or different locations. However, most electronic devices operate using electrical signals. Accordingly, optoelectronic modules may be used to convert optical signals to electrical signals or convert electrical signals to optical electrical, so optical signals may be used to transmit data between electronic devices. Optoelectronic modules typically communicate with a host device by transmitting electrical signals to the host device and receiving electrical signals from the host device. These electrical signals may then be transmitted by the optoelectronic module as optical signals.

One type of host device that may be implemented with optoelectronic modules is a network switch. A network switch may include multiple ports or cages to receive optoelectronic modules. In some configurations, the optoelectronic modules may include a coupling mechanism such as a latch to retain the optoelectronic modules in their respective ports or cages in the network switch. The coupling mechanism may also permit the optoelectronic modules to be removed from the ports or cages. However, in some circumstances, an optoelectronic module may unintentionally disengage from its port or cage.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, an optoelectronic module may include a housing enclosing at least one optical transmitter or receiver and a slider configured to move with respect to the housing. The slider may include at least one protrusion configured to engage a cage sized and shaped to receive the housing. The optoelectronic module may include a bail rotatably coupled to the housing. The bail may be configured to actuate the slider when the bail is rotated. The optoelectronic module may include a retainer including an occlusion member sized and shaped to be positioned inside of a port of the optoelectronic module. The retainer may define a surface configured to engage with the bail.

The surface of the retainer engaging with the bail may retain the bail and the slider in a fixed position with respect to the housing. The surface of the retainer may be configured to abut a handle of the bail when the occlusion member is positioned inside of the port. The retainer may include a body extending between a first end portion and a second end portion, and the occlusion member may be positioned on the first end portion. The surface of the retainer may extend from the second end portion in direction towards the first end portion. The surface of the retainer abutting the handle of the bail may prevent the bail from rotating when the occlusion member is positioned inside of the port.

The surface of the retainer may be defined by a shoulder positioned on a body of the retainer. The shoulder defining the surface of the retainer may extend parallel to the occlusion member. The retainer may abut a portion of the bail when the occlusion member is positioned in the port to retain both the bail and the slider in a fixed position with respect to the housing. The retainer may prevent the bail from rotating when the retainer is positioned in the port and consequently may prevent the slider from moving with respect to the housing to an unlocked position. The retainer may be formed of a resilient material such that the occlusion member deforms as it is positioned in the port. The retainer may be formed of a plastic or polymer material.

The protrusion of the slider may be configured to engage a corresponding resilient tab of the cage. The slider may include at least one arm extending along the housing, and the protrusion of the slider may be positioned on the arm. A resilient tab of the slider may extend towards a direction parallel to a longitudinal axis of the housing and may be biased towards the housing. The retainer may disable a release mechanism of the slider when engaged with the bail.

In another example, a method may include positioning an occlusion member of a retainer into a port of an optoelectronic module to occlude the port, and abutting a surface of the retainer with a bail of the optoelectronic module. The bail may be rotatably coupled to a housing of the optoelectronic module and may be configured to actuate a slider when the bail is rotated. Abutting the surface of the retainer with the bail of the optoelectronic module may prevent the bail from rotating. The surface of the retainer may abut a handle of the bail to prevent the bail from rotating. Abutting the surface of the retainer with the bail of the optoelectronic module may prevent the bail from rotating thereby disabling a slider coupled to the bail. The method may include removing the retainer from the port of the optoelectronic module to permit the bail to rotate and actuate a slider.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not

DETAILED DESCRIPTION

Figure 1A:
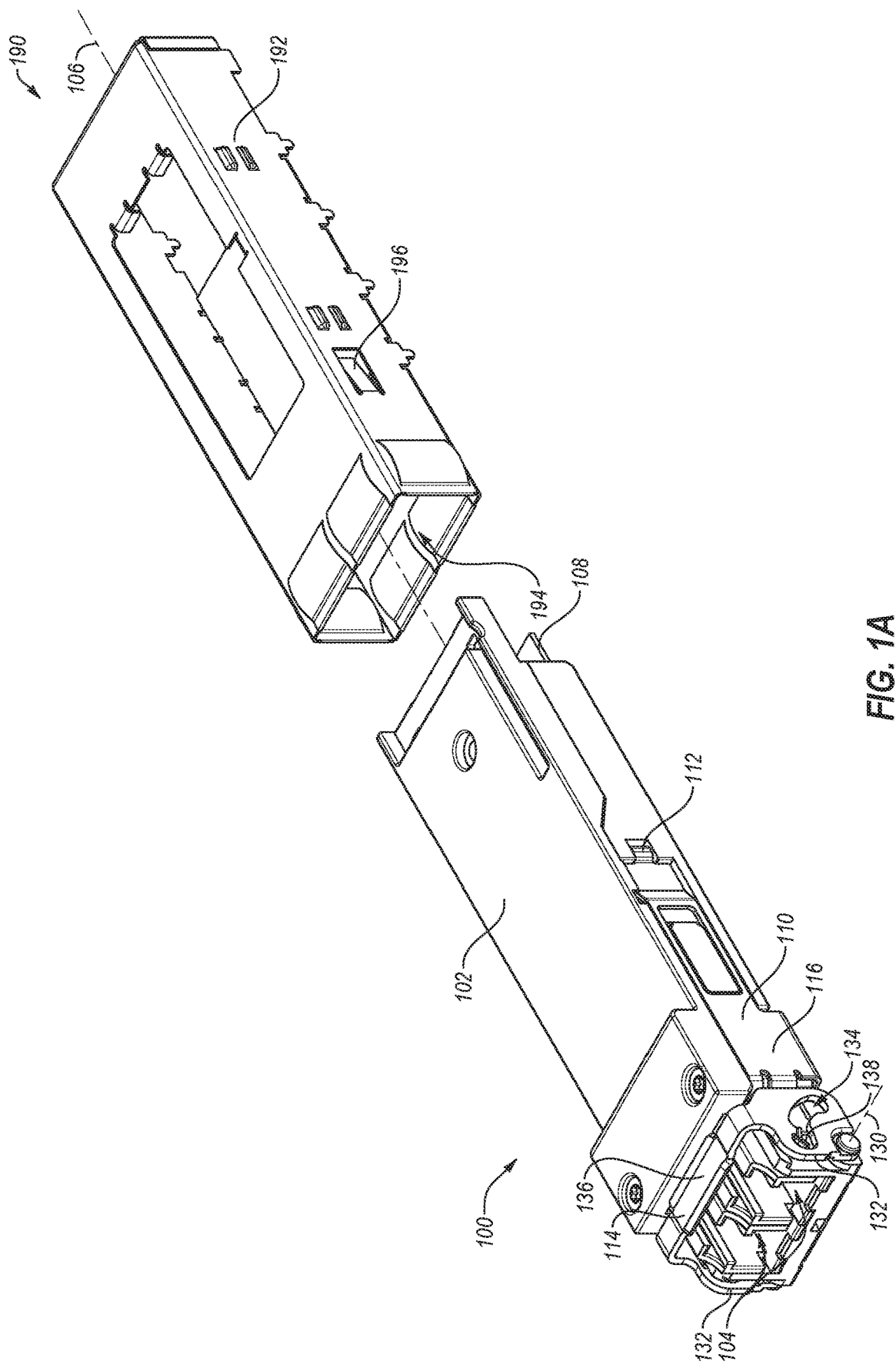
FIG. 1A is a perspective view of an optoelectronic module and a cage.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to retainers for optoelectronic modules, which may be implemented to prevent optoelectronic modules from unintentionally disengaging from a host device such as a network switch.

A network switch or other type of host device may be implemented to mechanically retain and communicatively couple multiple optoelectronic modules in a network. The network switch may include multiple ports or cages sized and shaped to receive optoelectronic modules. The optoelectronic modules may convert electrical signals to optical signals, or vice versa, to permit the optoelectronic modules to communicate with other network devices via optical signals. The optoelectronic modules may be communicatively coupled to the network switch, for example, to a printed circuit board assembly (PCBA) of the network switch, to permit the network switch to communicate with the other network devices.

In some configurations, the network switch and the optoelectronic modules may include a coupling mechanism such as a latch to retain the optoelectronic modules in their respective cages in the network switch. This coupling mechanism may also permit the optoelectronic modules to be removed from the cages of the network switch. However, in some circumstances, an optoelectronic module may unintentionally disengage from its cage. Accordingly, the described embodiments include retainers for optoelectronic modules, which may be implemented to prevent optoelectronic modules from unintentionally disengaging from the cages in a network switch.

Typically network switches may be shipped or distributed without optoelectronic modules positioned therein. Such configurations may be implemented, for example, to avoid damage to the optoelectronic modules during transport. However, in some circumstances it may be desirable to distribute network switches populated with optoelectronic modules. In particular, it may be desirable to ship network switches with optoelectronic modules positioned in at least some of the cages of the network switches. However, during movement associated with shipping, the optoelectronic modules may come loose or be shaken out of their respective cages. Furthermore, a release mechanism of an optoelectronic module may be unintentionally activated during shipping.

Optoelectronic modules that unintentionally disengage from their respective cages may result in damage to the optoelectronic modules or the network switch. Accordingly, the disclosed embodiments may include retainers to prevent optoelectronic modules from unintentionally releasing from the cages of the network switch, for example, during shipping. In particular, the disclosed embodiments may deactivate or disable a release mechanism of the optoelectronic module, thereby preventing the optoelectronic module from being removed from the cage of the network switch.

FIG. 1A illustrates an example of an optoelectronic module 100 and a corresponding cage 190. In particular, FIG. 1A is a perspective view of the optoelectronic module 100 and the cage 190. As illustrated, the optoelectronic module 100 includes a housing 102 which may enclose optical, electrical and optoelectronic components positioned therein. For example, the optoelectronic module 100 may include optoelectronic components such optical transmitters (e.g. lasers, etc.) and optical receivers (e.g., photodiodes, etc.) to convert electrical signals to optical signals and optical signals to electrical signals. The optoelectronic module 100 may also include corresponding optics such as lenses, collimators, filters, isolators, and the like to direct and modulate optical signals travelling to and from the optoelectronic components. The optoelectronic module 100 may include any suitable electrical components, such as drivers to drive the optical transmitters, amplifiers to amplify signals from the optical receivers, controllers to control the operation of the optoelectronic module 100 and the like. The above-mentioned optoelectronic, optical, and electrical components may be at least partially enclosed in a housing.

As illustrated, the optoelectronic module 100 may include one or more ports 104 to mechanically and optically couple the optoelectronic module 100 to optical fibers. The ports 104 may be sized and shaped to receive a connector of the optical fiber, such as ferrule or other suitable coupler. In the illustrated configuration, the optoelectronic module 100 includes two ports 104, which corresponds to two optical fibers, although any suitable configuration may be implemented. In the illustrated configuration, the optoelectronic module 100 extends along a longitudinal axis 106 and the optical fibers may be inserted into the ports 104 in a direction parallel to the longitudinal axis 106.

When optical fibers are coupled to the optoelectronic module 100, the optoelectronic module 100 may send and receive optical signals with other components in a network. The optoelectronic module 100 may include an electrical coupling 108 such as an edge connector to electrically couple the optoelectronic module 100 to a host device. Accordingly, the optoelectronic module 100 may permit the host device to communicate with other components in the network by converting electrical signals to optical signals to be transmitted to the other components in the network, and converting received optical signals to electricals signals to be used by the host device.

The cage 190 may include a body 192 defining an opening 194 sized and shaped to receive the optoelectronic module 100 (or the housing 102 of the optoelectronic module 100). The cage 190 may be included in a host device to mechanically and electrically couple the optoelectronic module 100. In particular, the cage 190 may receive and retain the optoelectronic module 100 in the opening 194. Furthermore, the host device may include an electrical coupling such as a socket that corresponds to the electrical coupling 108 of the optoelectronic module 100. The socket may receive the edge connector of the optoelectronic module 100 to electrically couple the optoelectronic module 100 to the host device.

Although the illustrated configuration includes one cage 190, the host device may include any suitable number of cages to interface with multiple optoelectronic modules. For example, if the host device is a fiber optic network switch, it may include configurations of 4, 8, 12, 24, 32, 48, 54 ports or any other suitable number of ports and corresponding optoelectronic modules.

The optoelectronic module 100 and the cage 190 may include a coupling mechanism to retain the optoelectronic module 100 with respect to the cage 190. In particular the cage 109 may include resilient tabs 196 and the optoelectronic module 100 may include a slider 116 with arms 110 configured to engage with the tabs 196 of the cage 190 to prevent removal of the optoelectronic module 100 from the cage 190. In particular, the arms 110 may include protrusions 112 that engage the tabs 196 of the cage 190 thereby preventing movement of the optoelectronic module 100, for example, in a direction parallel to the longitudinal axis 106. The slider 116 and the arms 110 may move with respect to the housing 102 of the optoelectronic module 100, in a direction parallel to the longitudinal axis 106, to engage or disengage the protrusions 112 with respect to the tabs 196. As shown, the arms 110 extend along the housing 102 in a direction parallel to the longitudinal axis 106.

The optoelectronic module 100 may include a bail 114 coupled to the slider 116 to permit a user to move the slider 116 in a direction parallel to the longitudinal axis 106 to engage or disengage the optoelectronic module 100 with respect to the cage 190. In the illustrated configuration, the bail 114 is rotatably coupled to the housing 102 of the optoelectronic module 100 proximate the ports 104. In particular, the bail 114 may rotate about an axis of rotation 130 with respect to the optoelectronic module 100. The bail 114 may include sides 132 that extend laterally along the sides of the optoelectronic module 100 (e.g., the housing 102 proximate the ports 104)), and a handle 136 extending between the sides 132. The handle 136 may be sized and shaped to be grasped or otherwise manipulated by the user, for example, to rotate the bail 114 with respect to the housing 102 of the optoelectronic module 100. As shown, the bail 114 may include a substantially u-shaped configuration or cross-section, with the sides 132 and the handle 136 cooperatively surrounding a portion of the housing 102 and the ports 104 of the optoelectronic module 100. However, other configurations may be implemented according to the concepts described herein.

The sides 132 of the bail 114 may define an opening 134 sized and shaped to receive a coupling member 138 of the slider 116. The coupling member 138 may be positioned on each of the arms 110 of the slider 116, and the opening 134 may be positioned on the sides 132 of the bail 114. Therefore, the slider 116 may include two coupling members 138 (e.g., one on each side), and the bail 114 may include corresponding openings 134 (e.g., one on each side).

The openings 134 may be sized and shaped such that the coupling members 138 abut the sides of the openings 134 so the bail 114 may move the slider 116. In such configurations, when the bail 114 is rotated (e.g., when the handle 136 of the bail 114 is rotated away from the cage 190 or the electrical coupling 108), the slider 116 may displaced (e.g., moved or slid) with respect to the housing 102, in a direction parallel to the longitudinal axis 106 (e.g., away from the cage 190 or the electrical coupling 108).

Figure 1B:
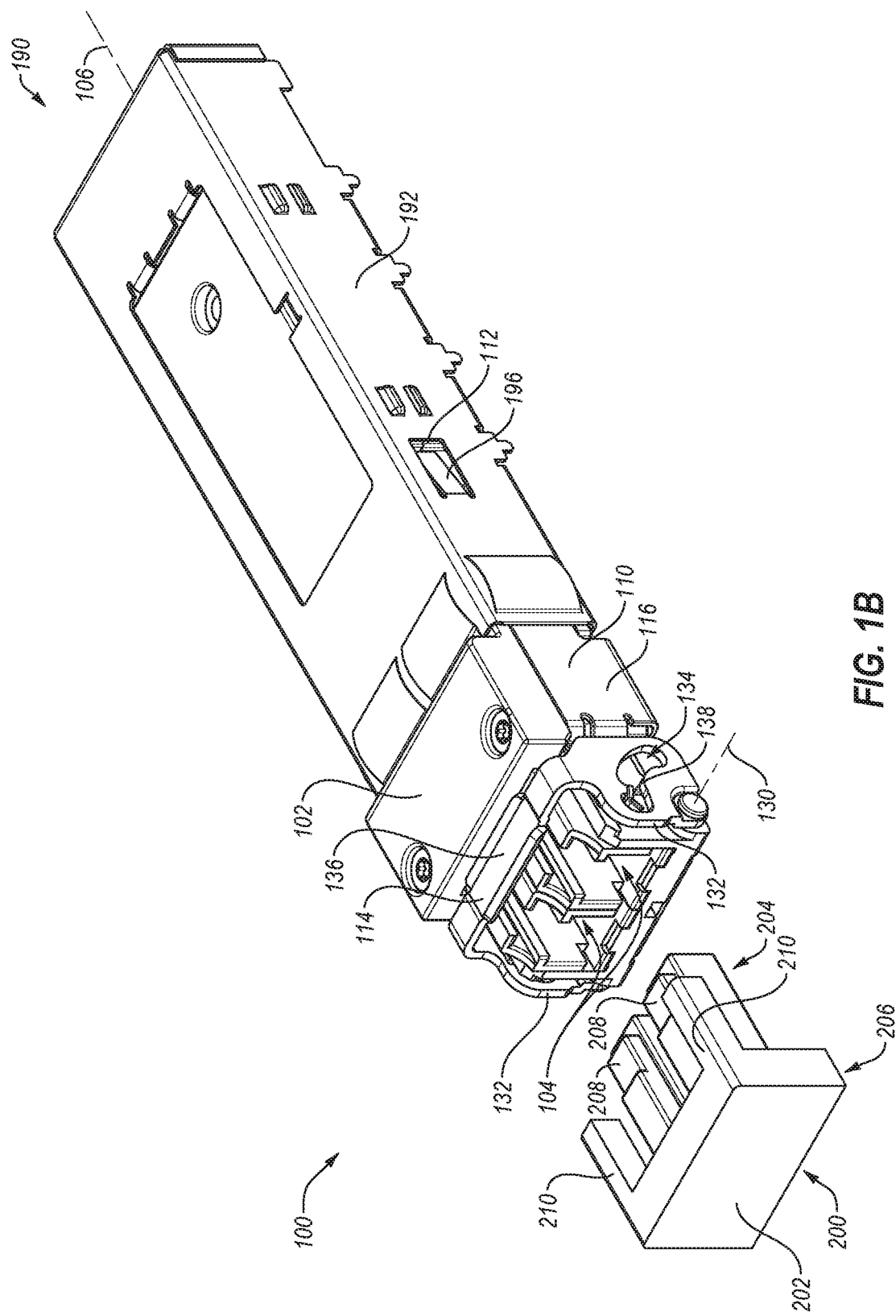
FIGS. 1B-1C are perspective views of the optoelectronic module positioned inside of the cage and a retainer.
Figure 1C:
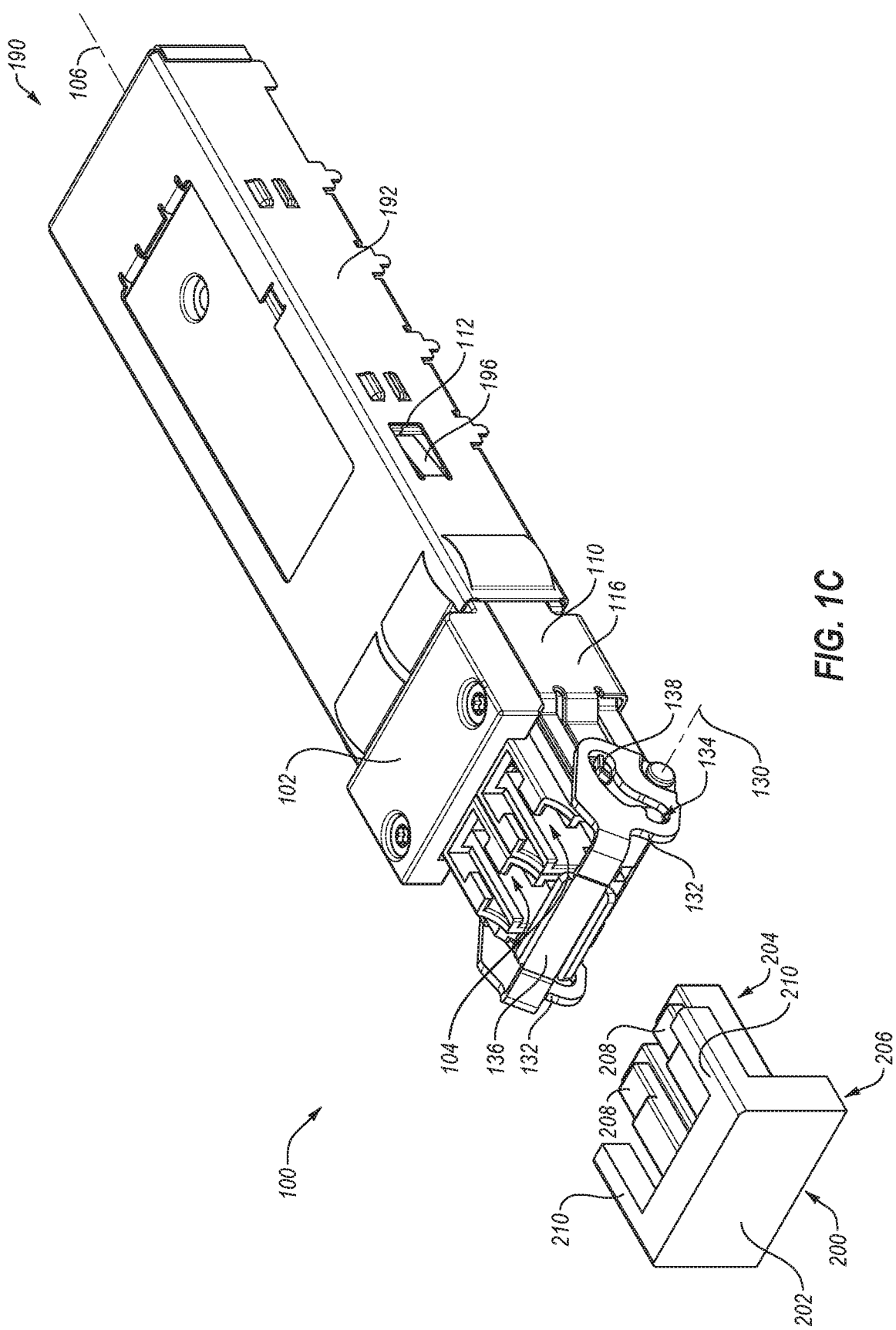

FIGS. 1B and 1C are perspective views of the optoelectronic module 100 positioned inside of the cage 190. As shown, the optoelectronic module 100 may be inserted in the opening 194 and slid into the cage 190 until the housing 102 abuts the cage 190. Once the optoelectronic module 100 is positioned in the cage 190, the protrusions 112 may engage the tabs 196 to prevent the optoelectronic module 100 from being removed from the cage 190, as shown. Since the tabs 196 are resilient, they may be displaced by the protrusions 112 as the optoelectronic module 100 is inserted into the cage 190, until the protrusions 112 move beyond and abut the ends of the tabs 196, in the engaged position shown.

In addition, FIGS. 1B-1C illustrate a retainer 200. The retainer 200 may be implemented to prevent the optoelectronic module 100 from unintentionally disengaging from the cage 190. In the illustrated configuration, the retainer 200 may also be configured as a dust plug. Accordingly, the retainer 200 may be a combined retainer and dust plug for the optoelectronic module 100. In such configurations, the retainer 200 may be sized and shaped to be positioned in the ports 104. The retainer 200 may occlude the ports 104 to prevent contaminants such as dust and material from entering the port 104, for example, during transport, shipping or otherwise when the optoelectronic module 100 is not in use and is not coupled to optical fibers. Thus, the retainer 200 may avoid damage to the optoelectronic module 100 during transport.

As will be described in further detail below, the retainer 200 may be configured to deactivate or disable a release mechanism of the optoelectronic module 100, thereby preventing the optoelectronic module 100 from unintentionally releasing from the cage 190. Such configuration may permit network switches to be shipped with optoelectronic modules positioned in the cages, without the optoelectronic modules coming loose of their respective cages. Accordingly, the retainer 200 may prevent damage to the optoelectronic module 100 or the network switch during shipping.

As explained above, the slider 116 may move with respect to the housing 102 of the optoelectronic module 100 in a direction parallel to the longitudinal axis 106 to engage or disengage the protrusions 112 with respect to the tabs 196. Furthermore, the bail 114 is coupled to the slider 116 to permit a user to move the slider 116 in a direction parallel to the longitudinal axis 106 to engage or disengage the optoelectronic module 100 with respect to the cage 190. In the position shown in FIG. 1B, the slider 116 is in an engaged or locked position, with the slider 116 positioned towards the electrical coupling 108 along the longitudinal axis 106. In this position, the bail 114 is also rotated towards the electrical coupling 108, with the bail 114 abutting the housing 102, for example, as shown in FIG. 1B.

In the position shown in FIG. 1C, the bail 114 and the slider 116 are in a disengaged or unlocked position, with the bail 114 rotated away from the optoelectronic module 100. In the disengaged or unlocked position, the slider 116 may be positioned further from the electrical coupling 108 along the longitudinal axis 106. In this position, the protrusions 112 of the slider 116 may disengage the tabs 196 of the cage 190 to permit the optoelectronic module 100 to be removed from the cage 190. In particular, the protrusions 112 may displace the tabs 196 in a direction away from the optoelectronic module 100, permitting the slider 116 and the protrusions 112 to move past the tabs 196, for example, to permit the optoelectronic module 100 to be removed from the cage 190. A user may move the slider 116 to the disengaged or unlocked position by rotating the bail 114 (e.g., by pulling on the handle 136 of the bail 114), which is coupled to the slider 116. Thus, when a user rotates the bail 114, the slider 116 may be moved to the disengaged or unlocked position, thereby permitting the protrusions 112 of the slider 116 to move past the tabs 196.

The bail 114 and the slider 116 may not move beyond the disengaged or unlocked position, so when the user continues to pull on the bail 114 (e.g., the handle 136 of the bail 114), the entire optoelectronic module 100 will be pulled along with the bail 114, thereby pulling the optoelectronic module 100 from the cage 190. In practice, the when the user pulls on the bail 114, the optoelectronic module 100 may be removed from the cage 190, with the bail 114 first being rotated to displace the slider 116 into the disengaged or unlocked position and then the optoelectronic module 100 being pulled from the cage 190 by the bail 114.

Figure 1D:
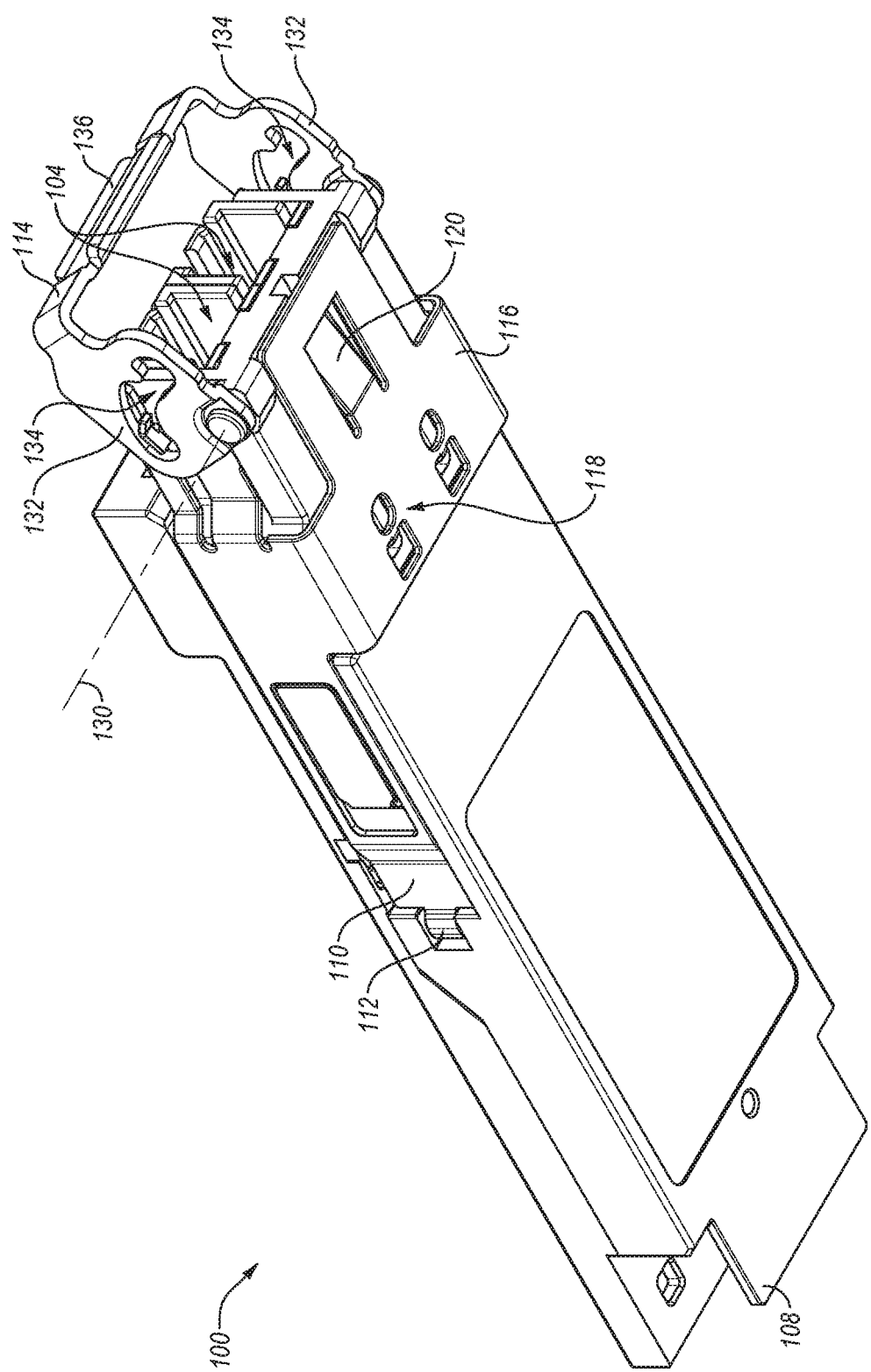
FIG. 1D is another perspective view of the optoelectronic module.

FIG. 1D is a perspective view of the optoelectronic module 100 removed from the cage 190. In particular, FIG. 1D illustrates the optoelectronic module 100 after the user rotates the bail 114 to disengage the slider 116, and pulls on the handle 136 of the bail 114 to remove the optoelectronic module 100 from the cage 190.

As shown in FIG. 1D, the slider 116 includes a resilient tab 120 that generally extends towards a direction parallel to the longitudinal axis 106 and is biased towards the housing 102 of the optoelectronic module 100. The resilient tab 120 may be positioned on a lateral portion 118 of the slider 116, which extends between and is coupled to the arms 110. While the arms 110 extend along two opposite facing sides of the optoelectronic module 100, the lateral portion 118 may extend perpendicular to the arms 110, as shown. In the illustrated configuration, the lateral portion 118 and the arms 110 are integral with the slider 116, and form a u-shaped slider member (e.g., having a u-shaped cross-section). In such circumstances, the slider member may include two arm portions (e.g., arms 110) and the lateral portion 118 extending therebetween. However, other suitable configurations may be implemented.

The retainer 200 may be configured to prevent the bail 114 from being moved with respect to the housing 102 or the rest of the optoelectronic module 100 (e.g., in the longitudinal direction) to the disengaged or unlocked position. This in turn prevents the slider 116 from releasing the optoelectronic module 100, to prevent the optoelectronic module 100 from being removed from the cage 190 (e.g., as shown in FIG. 1D), and from unintentional release from the cage 190.

Figure 2:
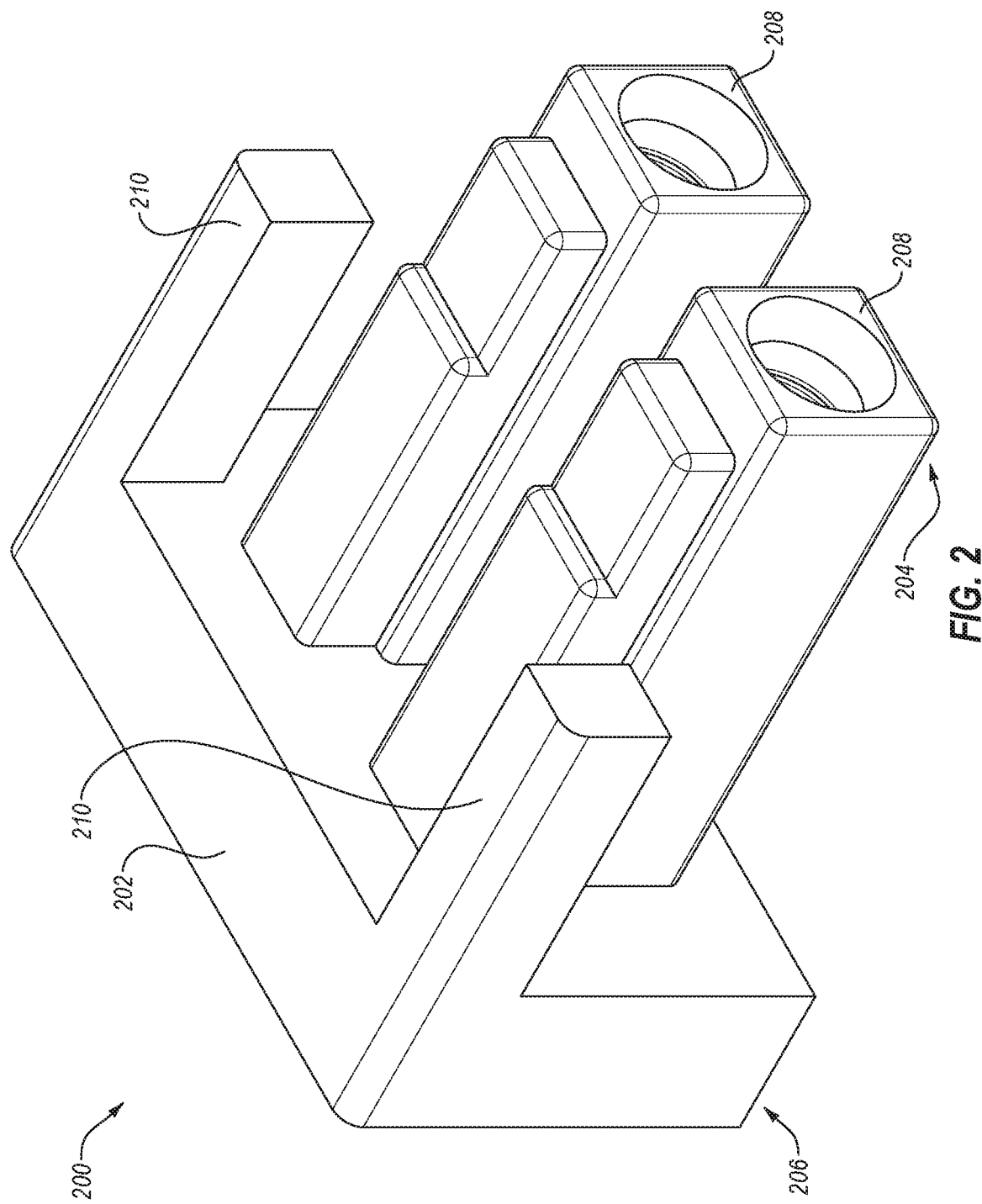
FIG. 2 is a perspective view of the retainer.

FIG. 2 is a perspective view of the retainer 200. As shown in FIG. 2 (as well as FIGS. 1B and 1C), the retainer 200 may include body 202 extending between a first end portion 204 and a second end portion 206. As explained above, the retainer 200 may occlude the ports 104. Accordingly, the first end portion 204 may include occlusion members 208 sized and shaped to be positioned inside of the ports 104. In the illustrated configuration, the retainer 200 includes two occlusion members 208 corresponding to the two ports 104. However, the retainer 200 may include any suitable number of occlusion members 208, depending on the number of ports 104 included in the optoelectronic module 100. In addition to being sized and shaped to be positioned in the ports 104, the occlusion members 208 may be spaced apart from one another a distance that correspond to a distance between the ports 104. In the illustrated configuration, the occlusion members 208 are sized to be positioned fully inside of the ports 104, however, in other configurations the occlusion members 208 may only partially fill the ports 104. Although the occlusion members 208 may not entirely fill the ports 104, they may still sufficiently occlude the ports 104 to prevent materials from entering the ports 104.

Figure 3A:
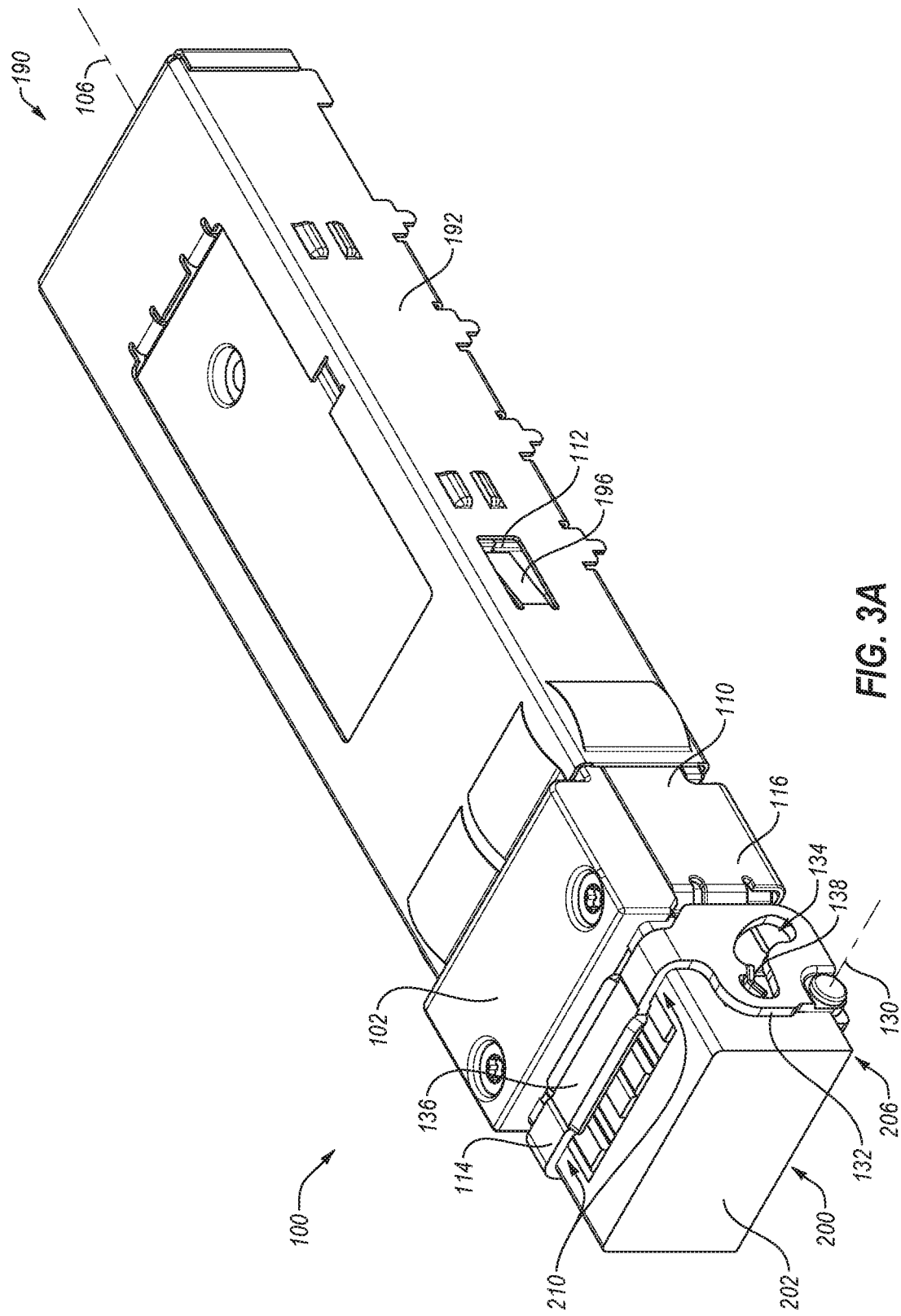
FIG. 3A is a perspective view of the retainer engaged with the optoelectronic module.
Figure 3B:
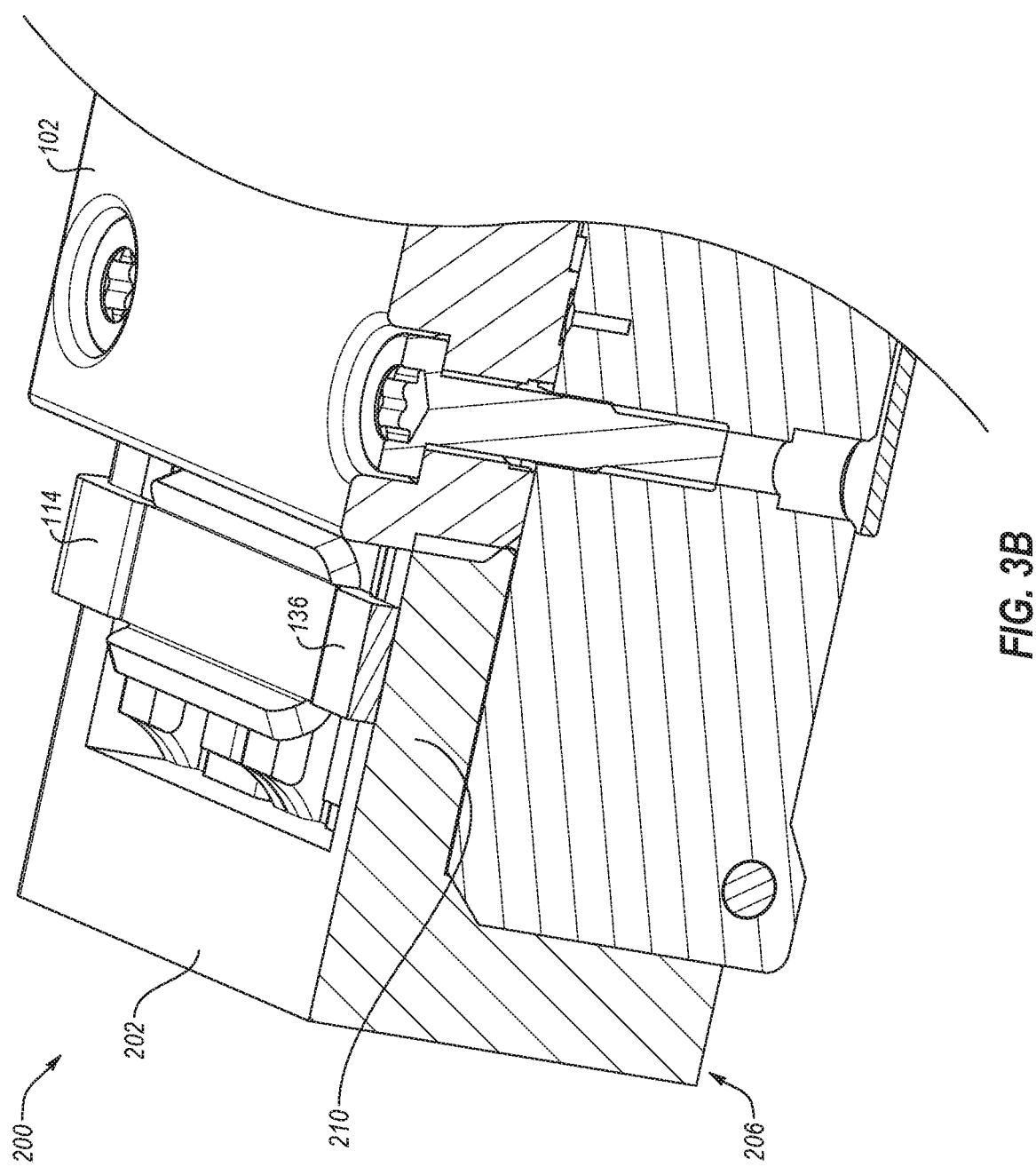
FIG. 3B is a section view of a portion of the optoelectronic module engaged with the retainer.

The second end portion 206 may include one or more shoulders or surfaces 210 that are configured to abut a portion of the bail 114 of the optoelectronic module 100 when the retainer 200 is engaged with the optoelectronic module 100 (see, for example, FIGS. 3A and 3B). In particular, the surfaces 210 are configured to abut the handle 136 of the bail 114 when the retainer 200 is engaged with the optoelectronic module 100, to prevent the bail 114 from rotating.

As shown, the surfaces 210 may be defined by the body 202 of the retainer 200. In particular, the surfaces 210 are defined by shoulders positioned on opposite sides of the body 202, although other configurations may be implemented. In the illustrated configuration, the shoulders defining the surfaces 210 face in the same direction as the occlusion members 208, and thus the shoulders defining the surfaces 210 extend parallel to the occlusion members 208. As shown, the surfaces 210 may extend from the second end portion 206 in direction towards the first end portion 204

The retainer 200 may be formed of a plastic or polymer material. Once positioned to engage the optoelectronic module 100, the retainer 200 may retain the optoelectronic module 100 in an engaged or locked position with respect to the housing 102. To disengage or unlock the retainer 200 with respect to the housing 102, the retainer 200 may be removed from the ports 104, which may disengage the surfaces 210 from the handle 136 of the bail 114, thereby permitting the bail 114 to be rotated and to permit the optoelectronic module 100 to be removed from the cage 190. Aspects of engaging and disengaging the retainer 200 will be described in further detail below.

FIGS. 3A and 3B are views of the retainer 200 engaged with the optoelectronic module 100. In particular, FIG. 3A is a perspective view of the retainer 200 engaged with the optoelectronic module 100, and FIG. 3B is a section view of a portion of the optoelectronic module 100 engaged with the retainer 200.

In the illustrated configuration, the retainer 200 is positioned in the ports 104 and abuts a portion of the bail 114 (e.g., at the handle 136) to retain both the bail 114 and the slider 116 in a fixed position (e.g., the engaged or locked position) with respect to the housing 102. The retainer 200 may prevent the bail 114 from rotating and consequently the slider 116 from moving with respect to the housing 102 in a direction parallel to the longitudinal axis 106 to the disengaged or unlocked position (e.g., in a direction away from the electrical coupling 108).

As shown in FIG. 3A, the retainer 200 may be positioned to occlude the ports 104, with the occlusion members 208 positioned in its corresponding ports 104. Accordingly, the occlusion members 208 may be sized and shaped to correspond to the size and shape of the ports 104. Additionally or alternatively, the occlusion members 208 may be spaced a distance apart from one another, and the distance may correspond to the spacing between the ports 104. In the engaged or locked position shown in FIG. 3A, the surface 210 of the retainer 200 abuts a portion the bail 114 (in particular, the handle 136), thereby preventing the bail 114 from being rotated and moving with respect to the housing 102.

In some configurations, the retainer 200 may be formed of a resilient material. In such configurations, the occlusion members 208 may be slightly larger than the corresponding ports 104. The resilience of the material of the retainer 200 may permit the occlusion members 208 to deform as they are positioned in the ports 104. Once the occlusion members 208 are positioned in the ports 104, the resilience of the material of the retainer 200 may retain the retainer 200 in the ports 104. For example, the occlusion members 208 may apply force against walls of the ports 104 by virtue of the resilience of the material of the retainer 200. Thus, the retainer 200 may be fixed with respect to both the housing 102 and the bail 114.

Since the bail 114 is coupled to the slider 116, the retainer 200 also retains the slider 116 with respect to the housing 102. This in turn prevents the slider 116 from moving with respect to the housing 102 to deactivate or disable the release mechanism of the slider 116, thereby preventing release of the optoelectronic module 100 from the cage 190.

To remove or disengage the retainer 200 from the optoelectronic module 100, the retainer 200 may be pulled away from the optoelectronic module 100, thereby removing the retainer 200 from the port 104. With the retainer 200 removed, the bail 114 may be rotated to actuate the slider 116, which in turn activates or enables the release mechanism of the slider 116, thereby permitting the optoelectronic module 100 to be removed from the cage 190.

FIG. 3B is a section view of a portion of the optoelectronic module 100 engaged with the retainer 200. In the section view of FIG. 3B, the surface 210 of the retainer 200 abutting the handle 136 of the bail 114 is shown in further detail. As illustrated, when the surface 210 of the retainer 200 abuts the handle 136, the bail 114 is unable to rotate. In particular, the retainer 200 is positioned in a path of motion or path of rotation of the bail 114. Therefore, the bail 114, and in particular, the surface 210, obstructs the bail 114 so it cannot rotate while the retainer 200 is engaged with the optoelectronic module 100 (e.g., when the retainer 200 is positioned in the ports 104).

As mentioned above, FIG. 1D, illustrates the optoelectronic module 100 with the retainer 200 removed, with the optoelectronic module 100 in a disengaged or unlocked position. When the retainer 200 is not engaged with the optoelectronic module 100 (e.g., by restricting movement of the bail 114), the slider 116 may move with respect to the housing 102 to the disengaged or unlocked position shown. For example, a user may move the slider 116 to the disengaged or unlocked position by pulling on the handle 136 of the bail 114, which is coupled to the slider 116.

In the disengaged or unlocked position, the slider 116 may be positioned further along the longitudinal axis 106 away from the electrical coupling 108, as shown. In this position, the protrusions 112 of the slider 116 may disengage the tabs 196 of the cage 190 to permit the optoelectronic module 100 to be removed from the cage 190. When the user continues to pull on the handle 136 of the bail 114, the entire optoelectronic module 100 will be pulled along with the bail 114, thereby removing the optoelectronic module 100 from the cage 190.

As explained above, the disclosed configurations of the retainer 200 may deactivate or disable the release mechanism of the optoelectronic module 100, to prevent the optoelectronic module 100 from unintentionally releasing from the cage 190, for example, during shipping or transport. In particular, the retainer 200 may be implemented to deactivate or disable the bail 114, which is coupled to the slider 116 release mechanism, thereby preventing the optoelectronic module 100 from being removed from the cage 190, which may be implemented in a network switch. To deactivate or disable the slider 116 release mechanism, the retainer 200 the handle 136 of the bail 114 (which in turn is coupled to the slider 116) to prevent the bail 114 from rotating to the disengaged or unlocked position. Since the retainer 200 abuts the handle 136, the bail 114 is prevented from moving or rotating to the disengaged or unlocked position until the retainer 200 is removed.

In one example, a method of engaging the retainer 200 with the optoelectronic module 100 may include positioning the occlusion members 208 of the retainer 200 into the corresponding ports 104 of the optoelectronic module 100, for example, as shown in FIG. 3A. The method of engaging the retainer 200 may continue by positioning the occlusion members 208 fully into the corresponding ports 104 of the optoelectronic module 100, for example, as shown in FIG. 3A. The method may include abutting the surface 210 of the retainer 200 against a portion the bail 114 or against the handle 136 of the bail 114, thereby preventing the bail 114 from moving or rotating with respect to the housing 102. Thus, the retainer 200 is engaged and fixed with respect to the bail 114 and the ports 104. Accordingly, the method may include engaging the retainer 200 with both the bail 114 and the ports 104 to retain the slider 116 with respect to the housing 102. Further, the method may include abutting the surface 210 of the retainer 200 with the handle 136.

In another example, a method of disengaging the retainer 200 with the optoelectronic module 100 may include moving the retainer 200 away from the optoelectronic module 100, and in particular, removing the occlusion members 208 out of the corresponding ports 104 of the optoelectronic module 100. The retainer 200 may be fully removed from the optoelectronic module 100, for example, as shown in FIGS. 1B and 1C.

In some configurations, the occlusion members 208 and the shoulders defining the surfaces 210 may be integral with respect to the body 202 of the retainer 200. That is, retainer 200 including the occlusion members 208, the surfaces 210, and the body 202 may be formed of a single piece of material. In the illustrated configuration, two of the occlusion members 208, two shoulder, and two of the surfaces 210 are included, with one on each side of the retainer 200. However, the retainer 200 may include any suitable number of occlusion members, shoulders and surfaces according to the concepts described herein. Further, other suitable features besides shoulders and engaging surfaces may be implemented to engage with the optoelectronic module 100.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc."

is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module comprising:
   a housing enclosing at least one optical transmitter or receiver;
   a slider configured to move with respect to the housing, the slider including at least one protrusion configured to engage a cage sized and shaped to receive the housing;
   a bail rotatably coupled to the housing, the bail configured to actuate the slider when the bail is rotated; and
   a retainer including an occlusion member sized and shaped to be positioned inside a port of the optoelectronic module, the retainer defining a surface configured to engage with the bail.

2. The optoelectronic module of claim 1, wherein the surface of the retainer engaging with the bail retains the bail and the slider in a fixed position with respect to the housing.

3. The optoelectronic module of claim 1, wherein the surface of the retainer is configured to abut a handle of the bail when the occlusion member is positioned inside of the port.

4. The optoelectronic module of claim 1, the retainer comprising a body extending between a first end portion and a second end portion, the occlusion member positioned on the first end portion.

5. The optoelectronic module of claim 4, the surface of the retainer extending from the second end portion in direction towards the first end portion.

6. The optoelectronic module of claim 1, wherein the surface of the retainer abutting the handle of the bail prevents the bail from rotating when the occlusion member is positioned inside of the port.

7. The optoelectronic module of claim 1, wherein the surface of the retainer is defined by a shoulder positioned on a body of the retainer.

8. The optoelectronic module of claim 7, wherein the shoulder defining the surface of the retainer extend parallel to the occlusion member.

9. The optoelectronic module of claim 1, wherein the retainer abuts a portion of the bail when the occlusion member is positioned in the port to retain both the bail and the slider in a fixed position with respect to the housing.

10. The optoelectronic module of claim 1, wherein the retainer prevents the bail from rotating when the retainer is positioned in the port and consequently prevents the slider from moving with respect to the housing to an unlocked position.

11. The optoelectronic module of claim 1, wherein the retainer is formed of a resilient material such that the occlusion member deforms as it is positioned in the port.

12. The optoelectronic module of claim 1, wherein the retainer is formed of a plastic or polymer material.

13. The optoelectronic module of claim 1, wherein the protrusion of the slider is configured to engage a corresponding resilient tab of the cage.

14. The optoelectronic module of claim 1, the slider comprising at least one arm extending along the housing, wherein the protrusion of the slider is positioned on the arm.

15. The optoelectronic module of claim 1, wherein a resilient tab of the slider extends towards a direction parallel to a longitudinal axis of the housing and is biased towards the housing.

16. The optoelectronic module of claim 1, wherein the retainer disables a release mechanism of the slider when engaged with the bail.

17. A method comprising:
   positioning an occlusion member of a retainer into a port of an optoelectronic module to occlude the port; and
   abutting a surface of the retainer with a bail of the optoelectronic module, the bail rotatably coupled to a housing of the optoelectronic module and configured to actuate a slider when the bail is rotated;
   wherein abutting the surface of the retainer with the bail of the optoelectronic module prevents the bail from rotating.

18. The method of claim 17, wherein the surface of the retainer abuts a handle of the bail to prevent the bail from rotating.

19. The method of claim 17, wherein abutting the surface of the retainer with the bail of the optoelectronic module prevents the bail from rotating thereby disabling a slider coupled to the bail.

20. The method of claim 17, further comprising removing the retainer from the port of the optoelectronic module to permit the bail to rotate and actuate a slider.

* * * * *